(12) United States Patent
Dolby et al.

(10) Patent No.: US 8,955,139 B2
(45) Date of Patent: Feb. 10, 2015

(54) SOUND AND EFFECTIVE DATA-FLOW ANALYSIS IN THE PRESENCE OF ALIASING

(71) Applicant: International Business Machines Corporation, Armonk, NY (US)

(72) Inventors: Julian Dolby, Bronx, NY (US); Salvatore A. Guarnieri, New York, NY (US); Marco Pistoia, Westchester, NY (US); Omer Tripp, Herzelyia (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/673,153

(22) Filed: Nov. 9, 2012

(65) Prior Publication Data

US 2014/0130154 A1    May 8, 2014

Related U.S. Application Data

(63) Continuation of application No. 13/671,886, filed on Nov. 8, 2012.

(51) Int. Cl.
*G06F 15/16* (2006.01)
*H04L 9/00* (2006.01)

(52) U.S. Cl.
USPC .......................................................... 726/25

(58) Field of Classification Search
CPC .............. G06F 11/3604; G06F 21/563; G06F 2221/033; H04L 63/1483
USPC ............. 726/25; 717/132, 124, 133, 144, 154
See application file for complete search history.

(56) References Cited

U.S. PATENT DOCUMENTS

| | | | |
|---|---|---|---|
| 5,535,394 A | 7/1996 | Burke et al. | |
| 8,141,049 B2 | 3/2012 | Kahlon | |
| 2003/0074655 A1 | 4/2003 | Robinson | |
| 2005/0273859 A1* | 12/2005 | Chess et al. | 726/25 |
| 2008/0201693 A1* | 8/2008 | Centonze et al. | 717/118 |
| 2010/0070955 A1 | 3/2010 | Kahlon | |
| 2011/0107297 A1* | 5/2011 | Chandra et al. | 717/110 |
| 2013/0091487 A1* | 4/2013 | Chandra et al. | 717/106 |

OTHER PUBLICATIONS

Marc Berndl el al., Points-to Analysis using BOOs, Jun. 9-11, 2003, PLDI'03.*
Ben-Chung Cheng et al., NPL: Modular Interprocedural Pointer Analysis Using Access Paths: Design, Implementation, and Evaluation, PLDI 2000, Vancouver, British Columbia, Canada.*

(Continued)

*Primary Examiner* — Andrew Nalven
*Assistant Examiner* — Mary Li
(74) *Attorney, Agent, or Firm* — Harrington & Smith; Louis J. Percello (57) ABSTRACT

A method, an apparatus, and a computer program product are disclosed that include tracking, using a data flow model of a program suitable for taint analysis of the program, information from sources of taint to entities in a heap using a model of the heap based on the program. The tracking is performed so that the information is relevant for taint propagation and is performed in a manner that is field-sensitive for the entities in the heap. The method, apparatus, and computer program product also include, based on output of the tracking, the operation of performing data-flow analysis to determine taint flow from the sources of the taint through data flow paths to sinks using the taint.

17 Claims, 6 Drawing Sheets

(56) References Cited

OTHER PUBLICATIONS

V. Benjamin Livshits et al., NPL—Finding Security Vulnerabilities in Java Applications with Static Analysis, Jul. 31-Aug. 5, 2005, the Proceedings of the 14th USENIX Security Symposium.*

Nenad Jovanovic a, Christopher Kruegel b,! and Engin Kirda, Static analysis for detecting taint-style vulnerabilities in web applications, Journal of Computer Security 18 (2010) 861-907, IOS Press.*

A. Deutsch, A Storeless Model of Aliasing and Its Abstractions Using Finite Representations of Right-regular Equivalence Relations, In Proceedings of the 1992 International Conference on Computer Languages, 1992 (12 pages).

S. Fink, E. Yahav, N. Dor, G. Ramalingam, and E. Geay, Effective Typestate Verification in the Presence of Aliasing, In ACM International Symposium on Software Testing and Analysis, 2006 (34 pages).

T. Reps, S. Horwitz, and M. Sagiv, Precise Interprocedural Dataflow Analysis via Graph Reachability, In Proceedings of the 22nd ACM SIGPLAN-SIGACT symposium on Principles of programming languages, 1995 (14 pages).

B. G. Ryder. Dimensions of Precision in Reference Analysis of Object-Oriented Languages. In Proceedings of the 12th international conference on Compiler Construction, 2003. Invited Paper (12 pages).

O. Tripp, M. Pistoia, S. J. Fink, M. Sridharan, and O. Weisman. TAJ: Effective Taint Analysis of Web Applications. In Proceedings of the 2009 ACM SIGPLAN conference on Programming language design and implementation, 2009 (11 pages).

B. G. Ryder. Dimensions of Precision in Reference Analysis of Object-Oriented Languages. 2003—Power Point Presentation;. http://www.cs.rutgers.edu/~ryder/ (169 pages).

Berndl, M. et al.; "Points-to Analysis using BDDs"; PLDI'03; Jun. 9-11, 2003; San Diego, California, USA; pp. 103-114.

Cheng, B. et al.; "Modular Interprocedural Pointer Analysis Using Access Paths: Design, Implementation, and Evaluation"; PLDI 2000; 2003; Vancouver, British Columbia, Canada; pp. 57-69.

Jovanovic, N. et al.; "Static analysis for detecting tint-style vulnerabilities in web applications"; Journal of Computer Security 18; 2010; pp. 861-907.

Livshits, V. et al.; "Finding Security Vulnerabilities in Java Applications with Static Analysis"; Proceedings of the 14$^{th}$ USENIX Security Symposium; Jul. 31-Aug. 5, 2005; whole document (31 pages).

* cited by examiner

```
1:  var p = document.URL;
2:  var q = {};
3:  var r = p;
4:  q.f = r;
5:  document.location = q.f;
```

FIG. 1

```
1:  function id(x) {
2:    return x;
3:  }
4:  function set(y, z) {
5:    z.f = y;
6:  }
7:  var p = document.URL;
8:  var q = {};
9:  var r = id(p);
10: set(r, q);
```

FIG. 2

```
1:  function id(x) {
2:      return x;
3:  }
4:  function set(y, z) {
5:      var x = z.g;
6:      x.f = y;
7:  }
8:  var p = document.URL;
9:  var q = { g: { } };
10: var r = id(p);
11: var s = id(q);
12: set(r, s);
```

SOUND AND EFFECTIVE DATA-FLOW ANALYSIS IN THE PRESENCE OF ALIASING

CROSS REFERENCE TO RELATED APPLICATION

The present application claims is a continuation of U.S. patent application Ser. No. 13/671,886, filed on Nov. 8, 2012, the disclosure of which is hereby incorporated by reference in its entirety.

BACKGROUND

This invention relates generally to static analysis of program code and, more specifically, relates to data flow analysis.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Taint analysis comprises searching for flows of data from untrusted points of input (the sources) to sensitive consumers (the sinks). In a static version of taint analysis, a program is examined without executing the code making up the program. Instead, a model of the program is created. Such a model can include the flows of data, typically represented using a flow graph, which is a representation of all paths that might be traversed through a program during execution of the program. These data flows are potential security issues unless each data flow passes through an operation (such as a sanitizer) that renders the data safe. Given a call graph G, a static taint analysis algorithm typically comprises two stages:

1) G is traversed to find sources, sinks and sanitizers in the code:
  Sources are either values obtained through field-read instructions or values returned from calls to certain methods, called source methods;
  Sinks can be either fields of certain objects or parameters of given methods, called sink methods; and
  Sanitizers are only methods.

2) An inter-procedural data-flow analysis is performed starting at the sources to determine if there are tainted flows that reach sinks without having been intercepted by sanitizers. The analysis is seeded at the variables defined by source constructs. That is, the field-read instructions and source methods are seeded with tainted values and the tainted values are followed via data flow analysis to determine the flow of the taint.

While such analysis is beneficial, there are still problems with these conventional analyses. One problem that can occur involves aliasing, where, in one example, multiple fields of multiple objects refer to the same value. Aliasing may also involve relations in the heap, i.e., multiple local names for the same object. As is known, a heap is an area of memory used by a program for dynamic memory allocation. In terms of taint analysis, the model used to emulate a running program would also emulate the heap for that program. Aliasing in the heap would be problematic, as if the object having multiple local names is tainted, all of the multiple local names should also be marked as tainted. However, many taint analysis tools do not consider or cannot handle aliasing in the heap.

BRIEF SUMMARY

In an exemplary embodiment, a method is disclosed that includes, using a data flow model of a program suitable for taint analysis of the program, tracking information from sources of taint to entities in a heap using a model of the heap based on the program. The tracking is performed so that the information is relevant for taint propagation and is performed in a manner that is field-sensitive for the entities in the heap. The method includes, based on output of the tracking, performing data-flow analysis to determine taint flow from the sources of the taint through data flow paths to sinks using the taint.

In a further exemplary embodiment, an apparatus includes one or more memories and one or more processors, the one or more memories comprising computer-readable code, and the one or more processors in response to executing the computer-readable code causing the apparatus to perform the following: using a data flow model of a program suitable for taint analysis of the program, tracking information from sources of taint to entities in a heap using a model of the heap based on the program, wherein the tracking is performed so that the information is relevant for taint propagation and is performed in a manner that is field-sensitive for the entities in the heap; and based on output of the tracking, performing data-flow analysis to determine taint flow from the sources of the taint through data flow paths to sinks using the taint.

In a further exemplary embodiment, an apparatus is disclosed that comprises means, using a data flow model of a program suitable for taint analysis of the program, for tracking information from sources of taint to entities in a heap using a model of the heap based on the program, wherein the tracking is performed so that the information is relevant for taint propagation and is performed in a manner that is field-sensitive for the entities in the heap; and means, based on output of the tracking, for performing data-flow analysis to determine taint flow from the sources of the taint through data flow paths to sinks using the taint.

An additional exemplary embodiment is a computer program product, including a computer readable storage medium having computer readable program code embodied therewith, the computer readable program code including: code, using a data flow model of a program suitable for taint analysis of the program, for tracking information from sources of taint to entities in a heap using a model of the heap based on the program, wherein the tracking is performed so that the information is relevant for taint propagation and is performed in a manner that is field-sensitive for the entities in the heap; and code, based on output of the tracking, for performing data-flow analysis to determine taint flow from the sources of the taint through data flow paths to sinks using the taint.

DETAILED DESCRIPTION

Figure 3:
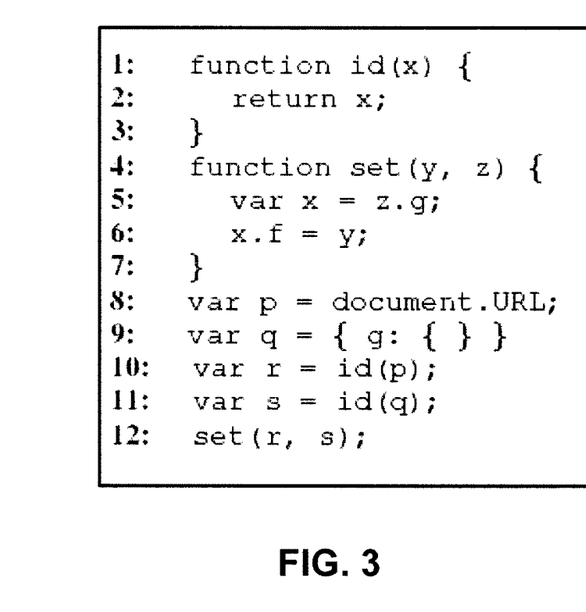
FIG. 3 is a code snippet with heap issues.
Figure 4:
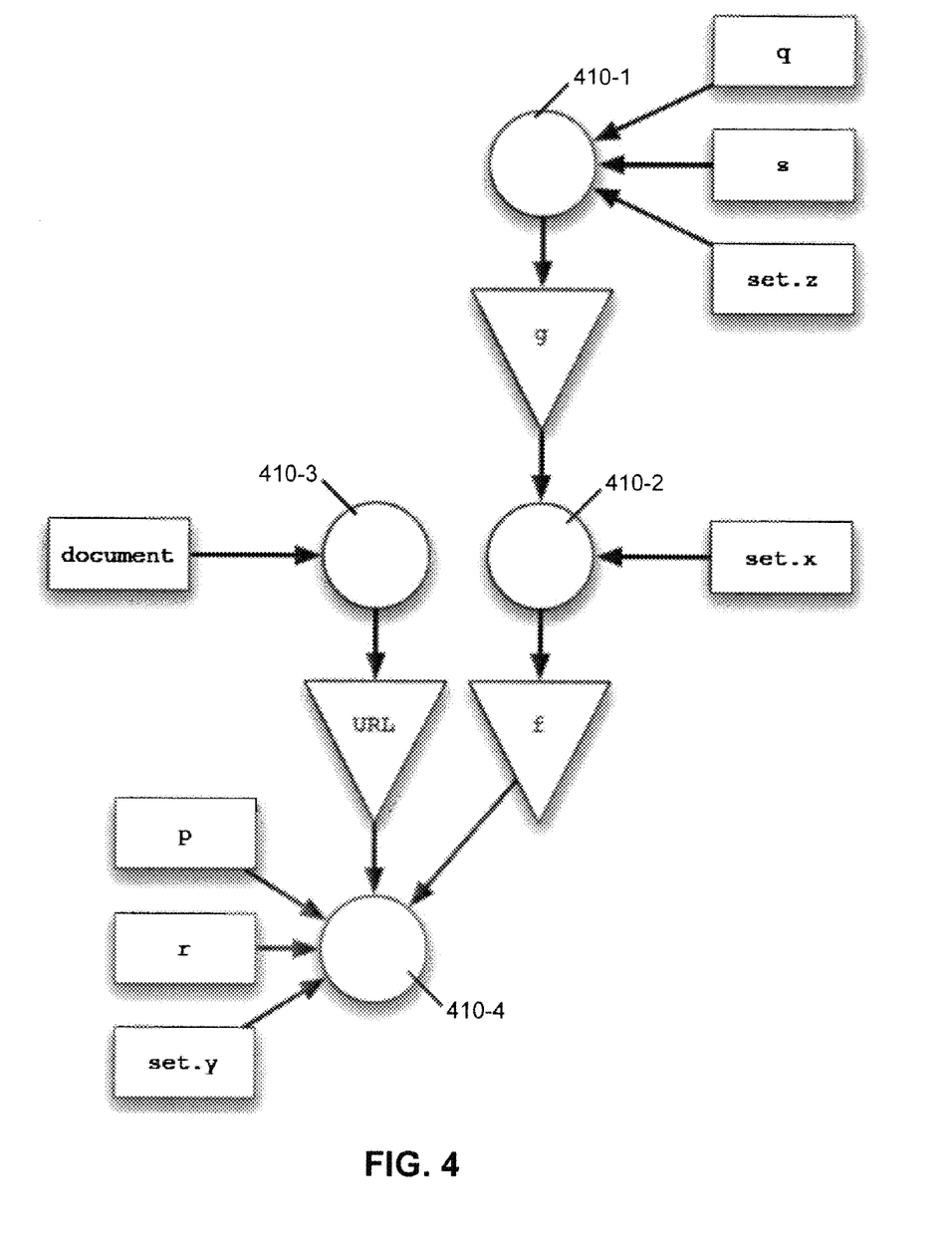
FIG. 4 is a visualization of a heap graph for the code snippet of FIG. 3.
Figure 5:
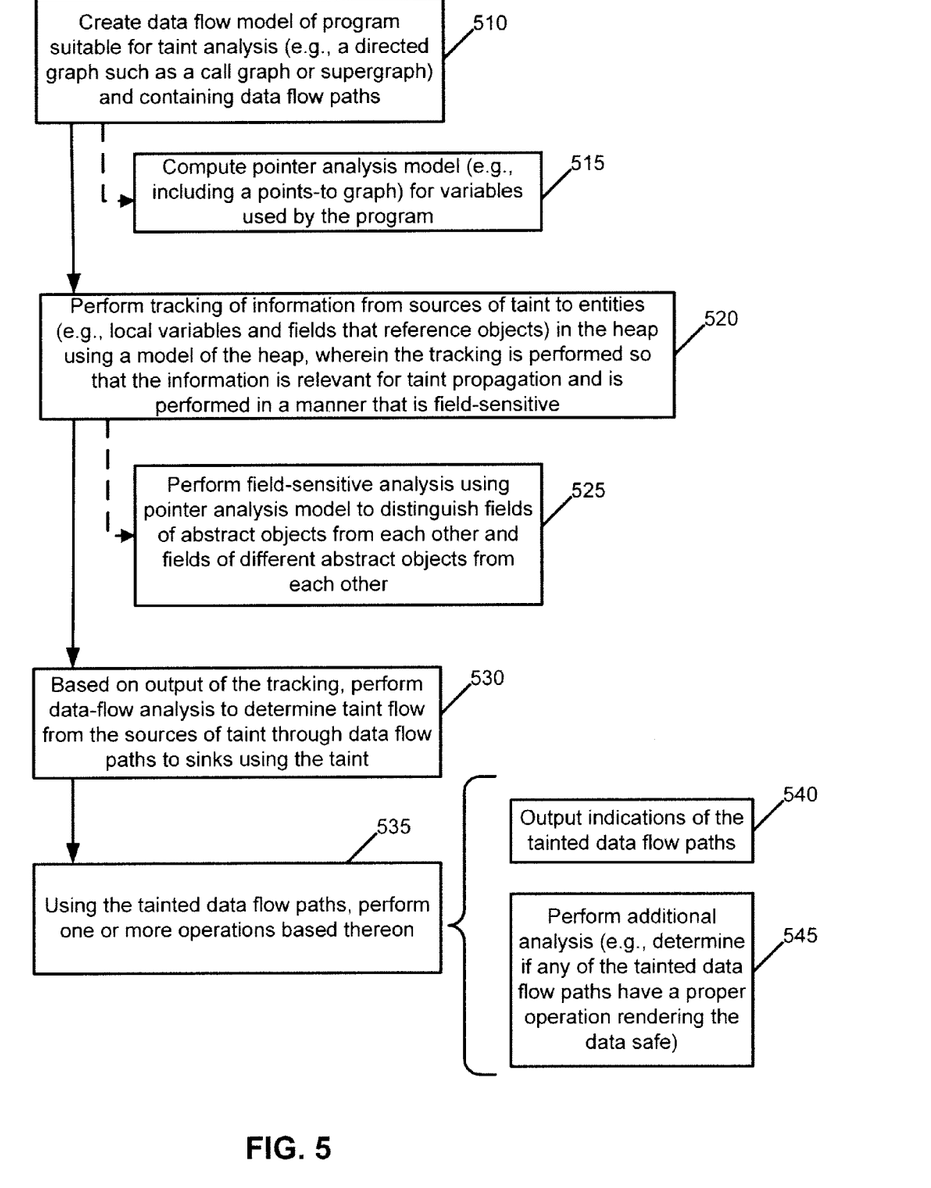
FIG. 5 is a block diagram of an exemplary logic flow diagram that illustrates the operation of an exemplary method, a result of execution of computer program instructions embodied on a computer readable memory, and/or functions performed by logic implemented in hardware, in accordance with exemplary embodiments of this invention.
Figure 6:
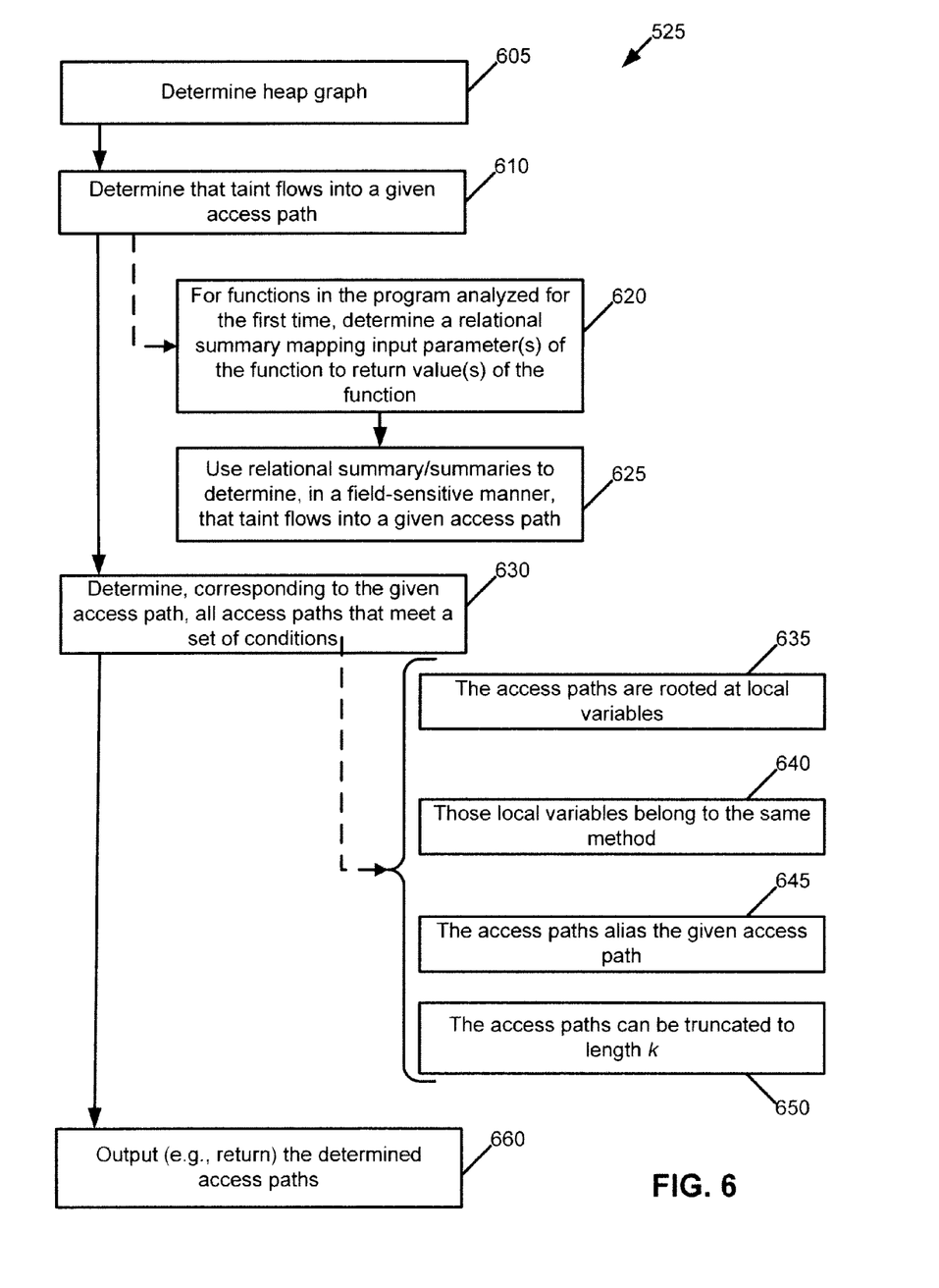
FIG. 6 is a block diagram of an exemplary logic flow diagram that illustrates the exemplary operation of a block in FIG. 5 and further an exemplary method, a result of execution of computer program instructions embodied on a computer

Exemplary embodiments herein are described through reference to FIGS. 1-7. In particular, description of certain blocks of FIGS. 5 and 6 are interspersed with reference to other figures. FIG. 5 is a block diagram of an exemplary logic flow diagram that illustrates the operation of an exemplary method, a result of execution of computer program instructions embodied on a computer readable memory, and/or functions performed by logic implemented in hardware, in accordance with exemplary embodiments of this invention, and FIG. 6 is a similar block diagram for operations performed by one block in FIG. 5.

By way of introduction, taint analysis is performed to determine tainted data flows by modeling statically (i.e., without execution of the program) a program. Taint analysis may be performed to output a set of tainted paths through the program. Taint analysis may be further performed, for instance, to examine the set of tainted paths and perform additional analysis on the tainted paths, such as by determining whether any of the tainted paths have a proper operation (e.g., at a proper location) performed on tainted data to render the data safe. This additional analysis reduces the number of tainted paths.

As described above, regardless of the taint analysis being performed, somehow taint has to be tracked from sources of taint to sinks that use taint. The rest of this disclosure assumes that a data flow model of a program has been created (block 510 of FIG. 5) that is suitable for taint analysis and that contains data flow paths. Such data flow models include a directed graph such as a call graph or supergraph. It is noted the block 515 is described below.

There is a relationship between entities in the heap and the data flows in the call graph. Specifically, entities in the heap such as local variable and fields that reference objects are potentially part of data flows that can therefore pass tainted information. However, because of aliasing in the heap, where aliasing includes multiple local names in the heap for the same object, unless the aliasing is tracked and managed in a field-sensitive manner, all of the affected data flows may not be found. For instance, the variables p and r may refer to the same object, but in a typical analysis of the heap, they may have the same local names and therefore taint may be associated with only one of the variables.

In block 520 of FIG. 5, therefore, tracking of information is performed from sources of taint to entities (e.g., local variables and fields that reference objects) in the heap using a model of the heap. The tracking is performed so that the information is relevant for taint propagation and is performed in a manner that is field-sensitive. The next portion of this disclosure provides additional detail on this block.

One way to tract taint is via access paths. To uncover vulnerable data-flow paths, a taint analysis should maintain the set of all heap locations for a program that store untrusted values. A naïve way of doing this is to explicitly model the entire heap, including all benign locations, and then track—at each point during the analysis—which portions of the heap are tainted. This solution is, in general, prohibitively expensive, and thus also unscalable, as demonstrated, e.g., in O. Tripp, M. Pistoia, S. J. Fink, M. Sridharan, and O. Weisman, TAJ: Effective Taint Analysis of Web Applications, in Proceedings of the 2009 ACM SIGPLAN conference on Programming language design and implementation, 2009. An exemplary solution herein uses a storeless view of the heap (see A. Deutsch, A Storeless Model of Aliasing and Its Abstractions Using Finite Representations of Right-regular Equivalence Relations, in Proceedings of the 1992 International Conference on Computer Languages, 1992), which—instead of representing the heap explicitly—tracks only information relevant for taint propagation; namely, which sequences of local variable and field dereferences may lead to untrusted data. To describe how an exemplary analysis tracks taint, it first presented how the storeless representation applies in the concrete setting: A standard concrete semantics is assumed for the problem of taint analysis, where a program state and an evaluation of an expression in a program state are defined. The following semantic domains are used:

| L | $\in$ objects |
|---|---|
| v | $\in$ Val = objects$\cup$\{null\} |
| $\rho$ | Env = VarId $\rightarrow$ Val |
| h | $\in$ Heap = objects $\times$ FieldId $\rightarrow$ Val |
| $\sigma = \langle L, \rho, h \rangle$ | $\in$ States = $2^{objects} \times$ Env $\times$ Heap | where objects represents an unbounded set of dynamically allocated objects, and VarId and FieldId are sets of local variables and field identifiers, respectively. Additionally, $\in$ means "is an element of", $\cup$ means union, $\rightarrow$ means "maps to", and $\times$ means Cartesian product, which consists of the set of all the pairs obtained by taking an element from the first set and an element from the second set: $A \times B = \{(a, b): a \in A, b \in B$. A program state, $\sigma$, thus maintains the set L of allocated objects, an environment $\rho$ mapping local variables to values, and a mapping h from fields of allocated objects to values.

As motivated above, the data-flow analysis carried out by an exemplary analysis is based on the notion of an "access path" (see S. Fink, E. Yahav, N. Dor, G. Ramalingam, and E. Geay, Effective Typestate Verification in the Presence of Aliasing, in ACM International Symposium on Software Testing and Analysis, 2006). Formally, an access path is a pair, $\langle v, \langle f1, \ldots, fn \rangle \rangle$, where v is a local variable, and $f1, \ldots, fn$ are field identifiers (which identify fields in objects, where a field stores state of an object). The evaluation of access path $\langle v, \langle f1, \ldots, fn \rangle \rangle$ in a concrete state $\sigma$ with an environment $\rho$ and a heap h yields the unique heap-allocated object o satisfying the following condition:

$$\exists o_1, \ldots, o_n \cdot o_1 = \rho(v) \wedge o_2 = h(o_1, f_1) \wedge \ldots \wedge o = h(o_n, fn),$$

such that o, $o_1, \ldots, o_n \in L$, where L is the set of allocated objects in $\sigma$. Additionally, $\exists$ means "there exists", "$\cdot$" means "such that", and $\wedge$ means "and". If no such object o exists, then the result of the evaluation is a failure, $\bot$.

The set of all access paths evaluating to object o in state $\sigma$ is a sound representation of object o, in that aliasing between access paths is made explicit, and so flows through the heap can be treated in a sound manner. Unfortunately, this set is, in general, not guaranteed to be finite even in the concrete setting, due to cycles in the heap (e.g., caused by recursive structures and back pointers). Even if the set is finite, deeply nested objects can produce very long chains.

This mandates in an exemplary embodiment a bound, k, on the length of tracked access paths for the static analysis to be tractable. An access path of length greater than k is then soundly approximated (or widened) by replacing its suffix, beyond the first k field identifiers, by a special symbol, *. The evaluation of widened access path $\langle v, \langle f1, \ldots, fk, * \rangle \rangle$ in concrete state $\sigma$ yields all the objects in L that are reachable via (zero or more) heap edges from the object ⟨v,⟨f1, ..., fk⟩⟩. In practice, it has been found that setting k=5 works well.

Access paths are a natural way of representing taint flows. Consider, for example, the program snippet in FIG. 1. The source statement at line 1 produces the seed access path ⟨p,ϵ⟩, where ϵ denotes an empty sequence of field identifiers (empty because document.URL is unknown initially and will be seeded). It is noted that the statement "var q={ }" indicates the variable q is initialized to an empty set. Next, the assignment at line 3 results in another tainted access path, ⟨r,ϵ⟩. The statement at line 4, which writes field f, leads to the emergence of a third access path, ⟨q,⟨f⟩⟩, which reaches the assignment to sink field "location" at line 5, and causes a vulnerability to be flagged.

To propagate tainted access paths, an exemplary proposed analysis employs a novel extension of the Reps-Horwitz-Sagiv (RHS) algorithm. See T. Reps, S. Horwitz, and M. Sagiv, Precise Interprocedural Dataflow Analysis via Graph Reachability, in Proceedings of the 22nd ACM SIGPLAN-SIGACT symposium on Principles of programming languages, 1995. The RHS algorithm provides a highly precise static-analysis framework to transform numerous data-flow problems into graph-reachability problems. Specifically, taint propagation is seeded at sources. Every time a tainted access path is used in an instruction, the analysis accordingly taints the access paths that are defined in that instruction.

The taint-propagation process is demand driven in the sense that access paths are instantiated only when taint reaches the access paths, which makes this algorithm very efficient. Another important characteristic of this algorithm is that the algorithm is context sensitive: Each method may assume multiple taint behaviors depending on the context in which it is invoked—a key requirement for precision.

Furthermore, an exemplary analysis herein enhances RHS since the exemplary analysis can handle issues that involve aliasing relations in the heap (i.e., multiple local names for the same object). This characteristic is not in the original RHS algorithm, which does not lend itself to modeling problems that involve aliasing relations established in different procedures.

First, how an exemplary algorithm works is illustrated in a simple case without aliasing issues, and then a discussion is provided as to how the heap is handled.

Regarding a basic taint-analysis algorithm, in the absence of any issues with heap aliasing, taint analysis is straightforward: a precise meet-over-all-feasible-paths solution can be computed using a standard Reps-Horwitz-Sagiv (RHS) solver. See T. Reps et al., cited above. How this works is illustrated using the example in FIG. 2.

Figure 1:
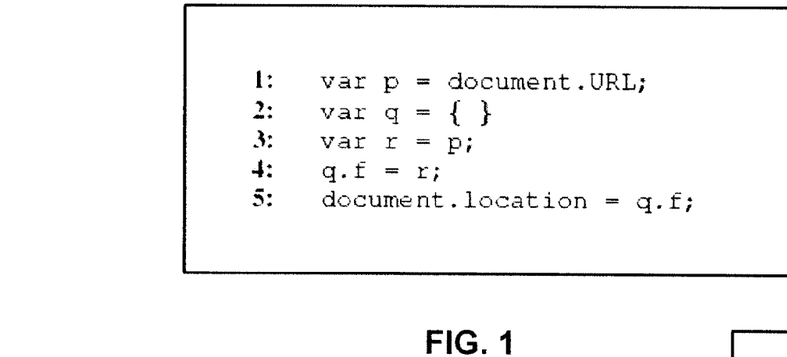
FIG. 1 is a code snippet illustrating tracking of tainted access paths.
Figure 2:
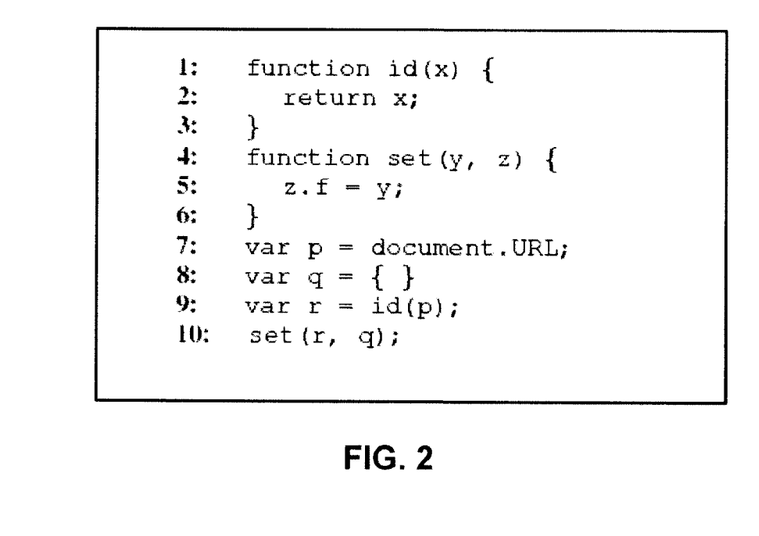
FIG. 2 is a code snippet without heap issues.

The read of "document.URL" at line 7 is a source of taint, which generates tainted access path ⟨p,ϵ⟩ (e.g., in this simple example, the taint is assigned to p). The value of p flows to the invocation of "id" at line 9. The analysis of "id", lines 1-3, reveals that this function simply propagates taint from its parameter to its return value, so the relational summary {x,ϵ}→⟨ret,ϵ⟩ is established for the "id" function (where ret is a privileged symbol denoting the return value of the method) and propagated to the callers of "id". Note that this relational summary is modular, in the sense that once the relational summary is determined for a function, the relational summary may simply be reused for each call of the function. It is also noted that this relational summary is an aspect of the instant invention. Applying this summary to the main method at line 9 generates the fact that access path ⟨r,ϵ⟩ is tainted.

The summary {x,ϵ}→⟨ret,ϵ⟩ is said to be relational because if there is another invocation of "id" in the program such that the argument passed to "id" is not tainted, the return value will correctly not be tainted in that case. Therefore, while a summary is generated at a callee and propagated to its callers, the summary is applied to a caller only when the relevant precondition holds in that caller. In this sense, this analysis is context sensitive: Taint propagation is performed based on the calling context. An example with two invocations to the "id" method—one with a tainted argument and the other with a non-tainted argument—will be presented below. It is also noted that the relational summaries also provide field sensitivity, since the relational summaries also modify fields in the accordance with the context sensitivity.

Continuing with the example of FIG. 2, the value of the variable r is passed to the "set" function at line 10. The "set" function (lines 4-6) contains a field-write instruction, which propagates taint from its first argument to field f of its second argument; that is, the function creates a non-empty access path. In this case, the function's relational summary is {y,ϵ}→⟨z,⟨f⟩⟩. Applying this summary to the caller of "set" adds the fact that ⟨q,⟨f⟩⟩ is tainted. This is true because application of the relational summary to the calling statement of "set(r, q)" yields {r,ϵ}→⟨q,⟨f⟩⟩. The access path ⟨r,ϵ⟩ was already determined to be tainted, but the access path ⟨q,⟨f⟩⟩ was not previously determined to be tainted. When the analysis terminates, it is learned that the access paths ⟨p,ϵ⟩, ⟨r,ϵ⟩ and ⟨q,⟨f⟩⟩ are tainted, which is a precise result.

Regarding a full taint-analysis algorithm that can handle aliasing, the program in FIG. 2 is an aliasing-free program: there are never multiple names for the same heap location. That is, ⟨q,⟨f⟩⟩ is the only name for the given location. Suppose, however, that some other variable pointed to the same location; in that case, the rules above might cause us to miss the fact that that the field of variable f is also tainted. For example, consider the variables q and s in the very similar program in FIG. 3; both variable q and variable s refer to the same object (object g, which is initially set to an empty set), and so any taint that results from one of them must carry over to the other. Hence, an exemplary taint-analysis algorithm extends the RHS algorithm to also account for heap aliasing based on the pointer-analysis model computed during call-graph construction. That is, in block 510 of FIG. 5, a data flow model of program suitable for taint analysis is created. This data flow model may be, e.g., a directed graph such as a call graph or supergraph and will contain (e.g., representations of) data flow paths. Creation of the data flow model may also include computing, e.g., as part of the data flow model or an adjunct thereto, a pointer analysis model for variables used by the program (block 515 of FIG. 5). The pointer analysis model, which may be a points-to graph, is a mathematical representation of the heap, usually represented as a bipartite graph in which a node can be of one of two types: an instance key (representing an object abstraction) and a pointer key (representing a field identifier). An edge from an instance key to a pointer key represents the fact that the class of the object represented by the instance key has a field identifier as the one represented by the pointer key. An edge from a pointer key to an instance key represents the fact that, during program execution, the field identifier represented by the pointer key may point to an object represented by the instance key.

As one example of block 520 of FIG. 5, e.g., performing tracking of information from sources of taint to entities, where the tracking performed in a manner that is field-sensitive, is illustrated in block 525 of FIG. 5. In block 525, a field-sensitive analysis is performed of the pointer analysis model to distinguish fields of abstract objects from each other and fields of different abstract objects from each other. FIG. 6 is a block diagram of an example of performing a field-sensitive analysis using the pointer analysis model. That is, in a further exemplary embodiment, to resolve aliasing relations, an abstraction of the pointer-analysis model, a "heap graph", is constructed. This occurs in block 605 of FIG. 6. The heap graph is a bipartite graph, $H = \langle B \cup \Delta, X \rangle$, where B is the set of environment and heap pointers in the program—that is, local variables and fields that reference objects (e.g., via field pointer keys), $\Delta$ is the set of object abstractions participating in the pointer-analysis solution, and X is the set of edges in the graph. Edge p→o from pointer p to abstract object o denotes that object o may be pointed-to by field p. Edge o→p from abstract object o to field p denotes that o owns field (e.g., field pointer in this case) p. This abstraction allows for the construction of such a heap graph because the abstraction is field-sensitive, meaning that the abstraction distinguishes the fields of an abstract object from each other as well as fields of different abstract objects. See B. G. Ryder, Dimensions of Precision in Reference Analysis of Object-Oriented Languages, in Proceedings of the 12th international conference on Compiler Construction, 2003, Invited Paper. One visualization for the heap graph for the program in FIG. 3 is illustrated by FIG. 4. In FIG. 4, a rectangle with a "q" (for instance) inside the rectangle indicates a pointer for the local variable "q"; a triangle with a "g" (as an example) inside the triangle indicates a pointer for field "g"; and the circles indicate abstract objects.

In the program of FIG. 3, there are two changes compared to FIG. 2. The first change is an additional call to "id" (line 11) which defines variable s, and the second change is the more complex "set" function (lines 4-7). Analysis at first proceeds as above, finding taint for $\langle p, \epsilon \rangle$ and $\langle r, \epsilon \rangle$.

The call to "set" illustrates the heap issues. The assignment "x.f=y" establishes the summary $\langle y, \epsilon \rangle \rightarrow \langle x, \langle f \rangle \rangle$, but that is clearly not sufficient: "x.f" refers to the same location as "zg.f", and the analysis needs to capture such taint. Sound reasoning about the effect of a field-write statement requires finding (a conservative approximation of) the set of access paths that are aliased with $\langle x, \langle f \rangle \rangle$ in the lexical scope of "set". This is not handled by the original RHS algorithm. The instant exemplary analysis, on the other hand, uncovers the aliases of $\langle x, \langle f \rangle \rangle$ as described below.

Every time taint flows into an access path (block 610 of FIG. 6), the instant exemplary analysis executes a function that is referred to herein as Aliases to determine local aliases (e.g., block 630), and then proceeds with the RHS-based taint propagation (block 530 of FIG. 5). RHS based taint propagation is described in T. Reps et al., cited above. An example of block 610 of FIG. 6 is illustrated by blocks 620 and 625. In particular, in block 620, for functions in the program analyzed for the first time, a relational summary is determined that maps input parameter(s) of the function to return value(s) of the function. Exemplary relational summaries have been described above and are also described below. In block 625, the relational summary/summaries are used to determine, in a field-sensitive manner, that taint flows into a given access path. Note that block 620 would be skipped for those functions that already have relational summaries.

For a given access path rooted at a local variable, a function Aliases may be defined (block 630) that returns all the access paths that satisfy the following conditions:

1) The access paths are rooted at local variables (block 635). This is equivalent to testing that is Local(v) evaluates to true.

2) Those local variables belong to the same method (block 640). This is equivalent to testing methodOf(v)=methodOf(w).

3) The access paths alias the given access path (block 650). This is equivalent to testing that the sets of abstract objects obtained with two calls to a function (called PathTo herein) have a non-empty intersection.

In addition to the three conditions (1)-(3), the access paths may be (4) truncated to a length k in block 650.

Mathematically, the Aliases function may use some very intuitive auxiliary functions, including Truncate, which limits the length of an access path to a given bound (e.g., k in block 650), and PathTo, which computes the set of abstract objects that are reachable through a given access path (block 650). In order to compute the set of abstract objects that are reachable through a given access path (block 650), a function (called FieldName herein) may be used. The function FieldName, given a field pointer in B, returns the corresponding field identifier in FieldId (i.e., a set of field identifiers, as described above). This is useful because, as was explained above, the instant exemplary analysis relies on a field-sensitive algorithm, and as such distinguishes field pointer keys of different abstract objects even when such field pointer keys represent an identically named field. In one sense, for block 630, current abstract objects reachable through a given path can be computed by performing a graph traversal. The examples provided above are one technique for performing the graph traversal through a given path, but other techniques may also be used.

In block 660, the access paths determined in block 630 are output (e.g., returned). In block 530 of FIG. 5, based on output of the tracking performed in block 520, data-flow analysis is performed to determine taint flow from the sources of taint through data flow paths to sinks using the taint. The data-flow analysis may be the RHS-based taint propagation described in T. Reps et al., cited above. That is, the access paths can be correlated with corresponding data flow paths in the data flow model in order to determine which data flow paths may be tainted. In block 535 of FIG. 5, using the tainted data flow paths, one or more operations are performed based thereon. For instance, in block 540, indication of the tainted data flow paths may be output. As another example, in block 545, additional analysis may be performed. Such analysis could include determining if any of the tainted data flow paths have a proper operation rendering the data safe. Once tainted data flow paths have been found, there are many different options known to those skilled in this area, and blocks 540 and 545 are merely two examples of such.

To return to the example of FIGS. 3 and 4, in this example, z is indeed a local variable of the same method (see, e.g., FIG. 3), and the global pointer analysis records that the g field of an object the g field can name may point to the same object as x; hence the heap path $\langle g, f \rangle$ for z resolves to the same abstract object as $\langle f \rangle$ for x. The path is short enough that there is no need to truncate the path. This is illustrated in FIG. 4, where the path from "set.x" through f leads to the same abstract object as the path from "set.z" through the fields g and f.

The exemplary analysis, therefore, computes the relational summary $\langle y, \epsilon \rangle \rightarrow \langle z, \langle g, f \rangle \rangle$ for the "set" function. Applying this summary at the caller site (line 12) adds access path $\langle s, \langle g, f \rangle \rangle$. Once again, this is incomplete, since and q denote the same object, and hence, once again, the operation performed in block 630 of FIG. 6 uncovers the additional access paths.

Note that the additional call to "id" (line 11 of FIG. 3) adds no taint information, since variable q is not tainted to begin with. The exemplary context-sensitive taint propagation analysis, discussed above, saves one from adding $\langle s, \epsilon \rangle$ to the set of tainted access paths, which would have made the analysis very coarse and generated numerous false positives. In fact, the tainted access path $\langle s,\langle g,f\rangle\rangle$ that is computed for the variable s using the instant example is much more precise than just the access path $\langle s,\epsilon\rangle$.

This exemplary algorithm for resolving aliasing relations is flow-insensitive with respect to fields, meaning that the algorithm does not account for strong updates on fields; i.e., if field f of object o is assigned value v and value w at two different program points, the analysis conservatively considers field f to point to the set of values $\{v, w\}$. Flow insensitivity may be performed when the call graph and points-to graph are built (block 510 in FIG. 5 and block 515 in FIG. 5, respectively), and may be further refined when the heap graph is built (block 605 of FIG. 6). Conversely, a flow-sensitive analysis attempts to determine which write instruction is performed first and which last, and based on that information the analysis reports that field f points to either value v or value w.

While flow-sensitive analyses may appear to be more precise, it is not always sound to use the analyses. This is true, e.g., for JavaScript. In JavaScript, the execution of programs is often event-driven—based, for example, on the click of a button or the interaction with a User Interface (UI) gadget—the order of execution of certain routines cannot always be established. Attempting to assert an order of execution can lead to unsound results. Therefore, to guarantee soundness, in an exemplary embodiment, it was chosen to conservatively make the analysis flow-insensitive with respect to fields.

Inside a procedure, however, the analysis can be flow sensitive with respect to local variables, and thus account for strong updates on the local variables, if a SSA (static single assignment) form is used. This is because SSA creates variable versions to make sure that each variable gets assigned only once, which indirectly provides a measure limiting access paths to length k.

Figure 7:
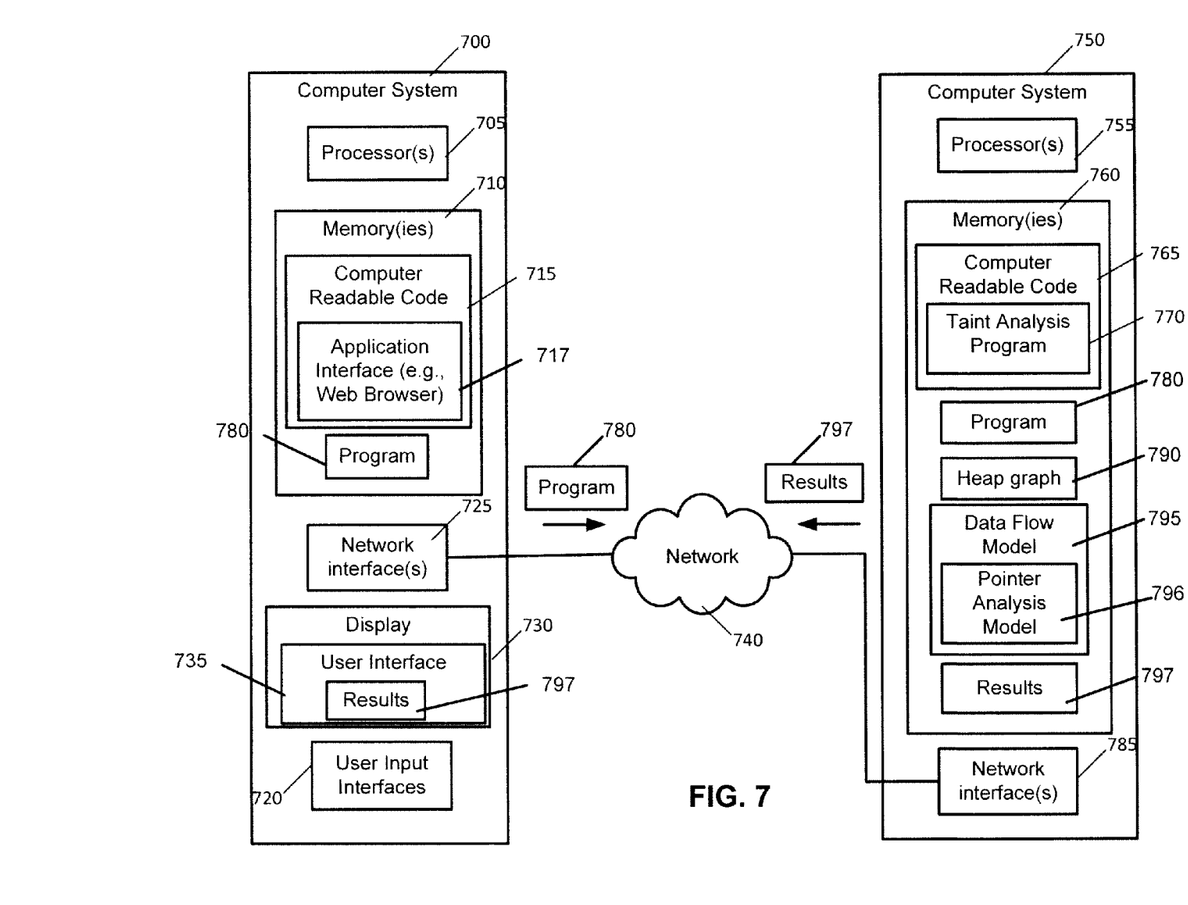
FIG. 7 is a block diagram of a system suitable for performing exemplary embodiments of the instant invention.

Turning to FIG. 7, an exemplary system is shown that suitable for performing exemplary embodiments of the invention. This system comprises a computer system 700 comprising one or more processors 705, one or more memories 710, one or more user input interfaces 720 (e.g., touchscreen interfaces, mouse interfaces, keyboard interfaces, and the like) and one or more network interfaces 725. The one or more memories 710 include computer readable code 715 that comprises an application interface 717, such as a Web browser, and a program 780. A user (not shown) of the computer system 700 uses the application interface 717 to send the program 780 to the computer system 750, which performs taint analysis on the program 780 and sends back results 797. The computer system 700 comprises (as shown in FIG. 7) or is coupled to a display 730 having a user interface 735 through which a user (not shown) can view, e.g., results 797. The program 780 may also be viewed via user interface 735.

This example is a networked example, where the computer system 700 communicates with another computer system 750 comprising one or more processors 755, one or more memories 760, and one or more network interfaces 785. The one or more memories 760 comprise computer readable code 765 comprising a taint analysis program 770, which performs some or all of the operations described above on the program 780 to generate the results 797. The one or more memories 760 also comprise the program 780, the heap graph 790, the data flow model 795, and the results 797. In this example, the data flow model 795 includes a pointer analysis model 796, although the two models 795, 796 may be separate. The computer systems 700, 755 communicate via a network 740, e.g., the Internet. In this example, the computer system 700 is a client and the computer system 750 is a server. The application interface 717 may be as simple as a Web interface to the taint analysis program 770, or could be more complex, such as an applet or client program.

In a non-networked example, a user of computer 750 would provide the program 780 to the computer system 750, and would receive results 797 via, e.g., a display (not shown) in or connected to computer system 750.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
one or more memories comprising computer-readable program code; and
one or more processors, the one or more processors in response to execution of the computer-readable program code causing the apparatus to perform the following:
using a data flow model of a program suitable for taint analysis of the program, tracking information from sources of taint to entities in a heap via aliasing in the heap and using a model of the heap based on the program,
wherein the tracking is performed so that the information is relevant for taint propagation and is performed in a manner that is field-sensitive for the entities in the heap, and
wherein tracking information further comprises:
performing a field-sensitive analysis using a pointer analysis model to distinguish fields of abstract objects in the heap from each other and fields of different abstract objects in the heap from each other;
determining that taint flows into a particular access path, wherein each access path is a pair linking a variable with a set of field identifiers, and wherein an evaluation of said access path can yield a unique object allocated in the heap;
determining all access paths, corresponding to the particular access path, that meet a set of conditions, using the heap graph; and
outputting the determined access paths that meet the set of conditions; and
based on output of the tracking, performing data-flow analysis to determine taint flow from the sources of the taint through data flow paths to sinks using the taint.

2. The apparatus of claim 1, wherein the field-sensitive analysis distinguishes field pointer keys of different abstract objects even when such field pointer keys represent an identically named field.

3. The apparatus of claim 1, wherein the pointer analysis model comprises a points-to graph.

4. The apparatus of claim 1, wherein the one or more processors are further configured in response to execution of the computer-readable program code to cause the apparatus to perform the following: determining the data flow model by analyzing the program and determining the pointer analysis model by analyzing the program.

5. The apparatus of claim 1, wherein performing a field-sensitive analysis using a pointer analysis model further comprises creating a heap graph comprising an intersection of a first set of environment and heap pointers in the program intersected with a second set of the abstract objects participating in the pointer analysis model, and further comprising a set of edges connecting elements of the first and second sets.

6. The apparatus of claim 5, wherein first set of environment and heap pointers in the program comprise local variables in the heap and fields that reference objects in the heap.

7. The apparatus of claim 6, wherein the evaluation is performed in a certain concrete state of the program with a particular environment and a particular heap to yield the unique object in the particular heap.

8. The apparatus of claim 6, wherein determining that taint flows into a particular access path further comprises determining, using a relational summary mapping for a function in the program, that taint flows into the particular access path.

9. The apparatus of claim 8, wherein determining that taint flows into a particular access path further comprises determining, for the function in the program that is analyzed for a first time, a relational summary mapping one or more input parameters of the function to one or more return values of the function.

10. The apparatus of claim 6, wherein the set of conditions comprises:
the access paths in the all access paths are rooted at local variables;
the local variables belong to a same apparatus; and
all of the access paths alias the particular access path.

11. The apparatus of claim 10, wherein the set of conditions further comprises: all of the access paths can be truncated to specific length.

12. The apparatus of claim 1, wherein the tracking information is performed in a manner that is also flow-insensitive with respect to fields, wherein in response to a field f of an object o in the heap being assigned value v and value w at two different program points, the field f is considered to point to the set of values.

13. The apparatus of claim 12, wherein the tracking information further comprises building a call graph and a points-to graph, and wherein flow insensitivity is performed when at least the call graph and points-to graph are built.

14. The apparatus of claim 1, wherein the one or more processors are further configured in response to execution of the computer-readable program code to cause the apparatus to perform the following: outputting indications of the data flow paths determined to be tainted by the performing the data-flow analysis.

15. A computer program product, comprising a non-transitory computer readable storage medium having computer readable program code embodied therewith, the computer readable program code comprising:
code, using a data flow model of a program suitable for taint analysis of the program, for tracking information from sources of taint to entities in a heap via aliasing in the heap and using a model of the heap based on the program,
wherein the tracking is performed so that the information is relevant for taint propagation and is performed in a manner that is field-sensitive for the entities in the heap, and
wherein tracking information further comprises:
performing a field-sensitive analysis using a pointer analysis model to distinguish fields of abstract objects in the heap from each other and fields of different abstract objects in the heap from each other;
determining that taint flows into a particular access path, wherein each access path is a pair linking a variable with a set of field identifiers, and wherein an evaluation of said access path can yield a unique object allocated in the heap;
determining all access paths, corresponding to the particular access path, that meet a set of conditions, using the heap graph; and
outputting the determined access paths that meet the set of conditions; and
code, based on output of the tracking, for performing data-flow analysis to determine taint flow from the sources of the taint through data flow paths to sinks using the taint.

16. A method, comprising:
using a data flow model of a program suitable for taint analysis of the program, tracking information from sources of taint to entities in a heap via aliasing in the heap and using a model of the heap based on the program,
wherein the tracking is performed so that the information is relevant for taint propagation and is performed in a manner that is field- sensitive for the entities in the heap, and
wherein tracking information further comprises:
performing a field-sensitive analysis using a pointer analysis model to distinguish fields of abstract objects in the heap from each other and fields of different abstract objects in the heap from each other;
determining that taint flows into a particular access path, wherein each access path is a pair linking a variable with a set of field identifiers, and wherein an evaluation of said access path can yield a unique object allocated in the heap;
determining all access paths, corresponding to the particular access path, that meet a set of conditions, using the heap graph; and
outputting the determined access paths that meet the set of conditions; and
based on output of the tracking, performing data-flow analysis to determine taint flow from the sources of the taint through data flow paths to sinks using the taint.

17. The method of claim 16, wherein the field-sensitive analysis distinguishes field pointer keys of different abstract objects even when such field pointer keys represent an identically named field.

* * * * *